June 22, 1954

C. J. FITCH 2,682,043

CHARACTER SENSING AND ANALYZING SYSTEM

Filed Dec. 27, 1951

INVENTOR
CLYDE J. FITCH
BY Robert S. Dunham
ATTORNEY

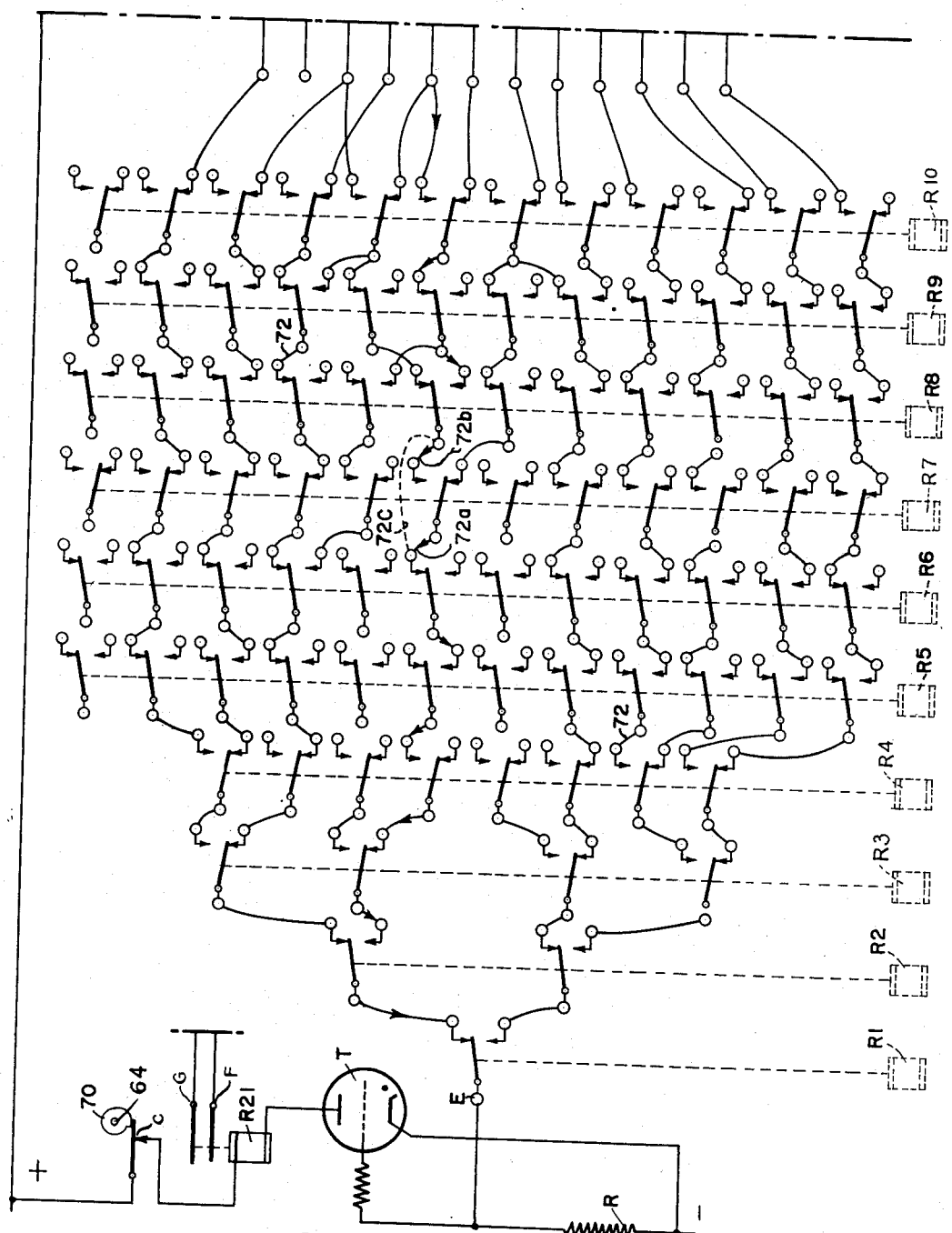

June 22, 1954

C. J. FITCH 2,682,043

CHARACTER SENSING AND ANALYZING SYSTEM

Filed Dec. 27, 1951

INVENTOR
CLYDE J. FITCH
BY Robert S. Dunham
ATTORNEY

Patented June 22, 1954

2,682,043

UNITED STATES PATENT OFFICE 2,682,043

CHARACTER SENSING AND ANALYZING SYSTEM

Clyde J. Fitch, Endicott, N. Y., assignor to International Business Machines Corporation, New York, N. Y., a corporation of New York Application December 27, 1951, Serial No. 263,581

7 Claims. (Cl. 340—147)

This invention relates to mechanism comprising a character reading and analyzing system. The invention has as its purpose the reading of manually written characters or typewritten characters including numerals and/or letters, together with means for ordering electrical impulses for the control of an external machine for the reproduction of such character either in the form of printed copy or in the form of punched code holes in record cards.

Heretofore attempts have been made to accomplish the general objective to which this invention is directed. Many of these prior art devices have been unsuccessful for the more limited utility for which they have been designed. In general, however, such prior devices have depended for their operation upon the use of some common characteristic in specially shaped characters or code marks or on uniform printing density of the character and the like on the original document.

The present invention is designed to avoid the stringent requirements of the prior art devices by using principles evolved by nature in developing the eye. Accordingly, it is the object of the present invention to provide a device that is capable of sensing and recognizing differently formed characters having a wide range of variations and possessing in many cases no common uniform characteristic. Accordingly, the invention is well adapted to the sensing and differentiation of hand written characters, either numerals or letters, and to the recognition of typewritten or printed characters having variations of form.

The invention specifically comprises a reading head and analyzing circuits controlled by the reading head. The reading head is composed of light-sensitive devices fixed in a predetermined arrangement and individual circuit connections to each of such light sensitive devices having in each thereof a relay operative upon change of condition of the related light sensitive devices. When energized, the relays are adapted to operate a plurality of contacts for establishing a plurality of parallel circuits between the relays. The light-sensitive devices may be photoelectric cells. The analyzing circuit includes a cross-grid network consisting of a plurality of mutually insulated conductors arranged in intersecting relation selectively controlled by the relay contacts and interconnecting circuits for completing an output circuit according to a preselected light-responsive pattern projected upon the photoelectric cells. Such circuit is adapted to emit an output pulse that is indicative of the character being read. The cross-grid network utilizes gaseous discharge devices such as neon lamps or diodes for interconnecting crossed conductors thereof at points of intersection for completing the desired circuit and blocking out undesired circuits. In order to lend great capacity for distinguishing wide variations in the form, shape and legibility of the characters, the mechanism makes use of pluggable jumper connections between contacts of the relays for ordering the cross-grid network to complete an output circuit according to variations of the light-responsive pattern.

In the drawings forming a part of this application, there has been shown mechanism that is sufficient for reading a plurality of variations of a single character. This is deemed to be sufficient for fully illustrating the principle of the invention; additional capacity for reading a greater number of variations of a single character may readily be obtained by enlarging the cross-grid network as may be required, and the capacity of such mechanism for sensing and analyzing a full complement of numerals and/or letters may be obtained by duplicating the analyzing circuit to provide one such circuit for each letter or numeral. Such multiple circuits can be rendered operative from a single reading head by connecting the respective circuit control relays thereof in parallel.

Figure 3A:
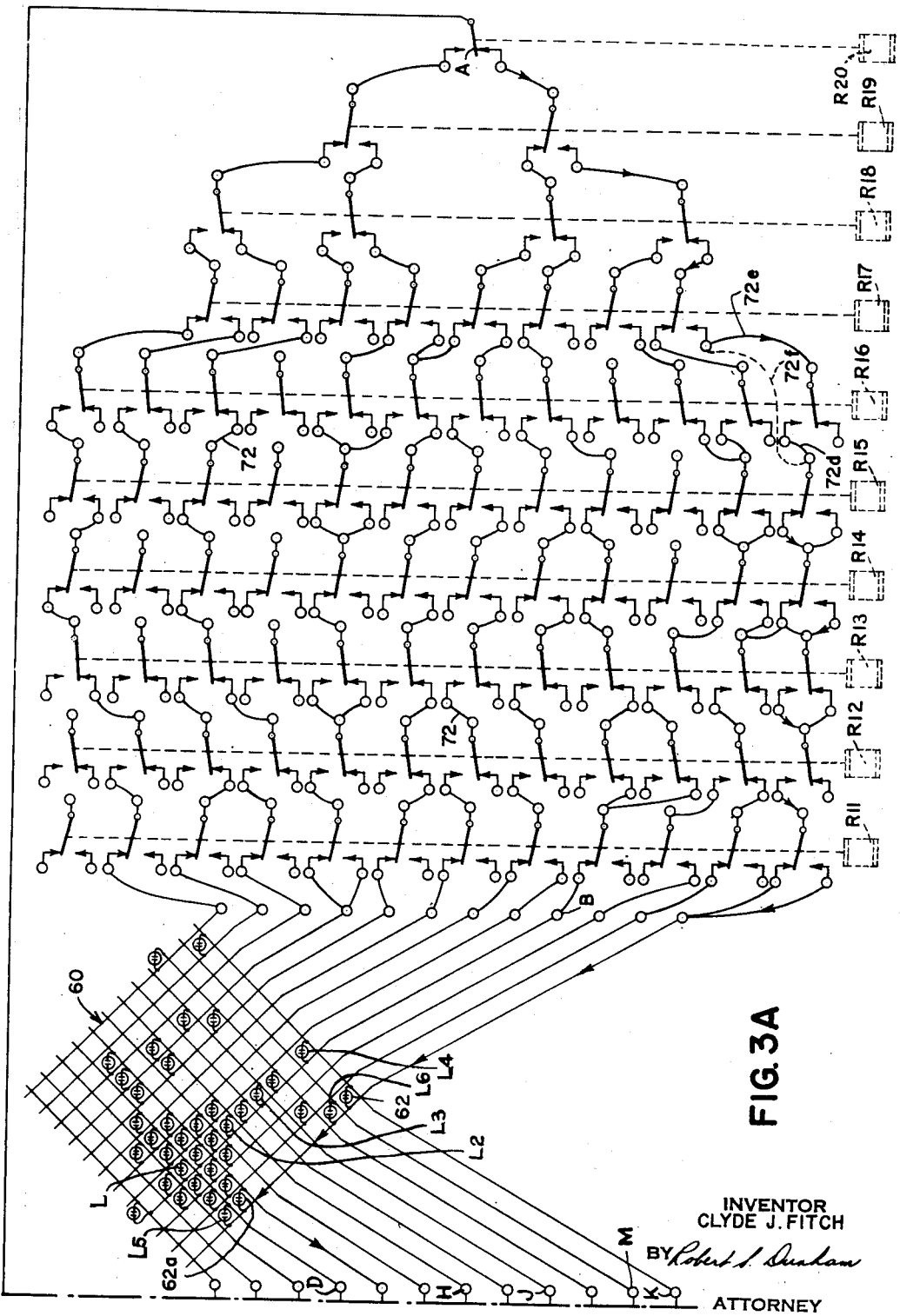
Figure 4:
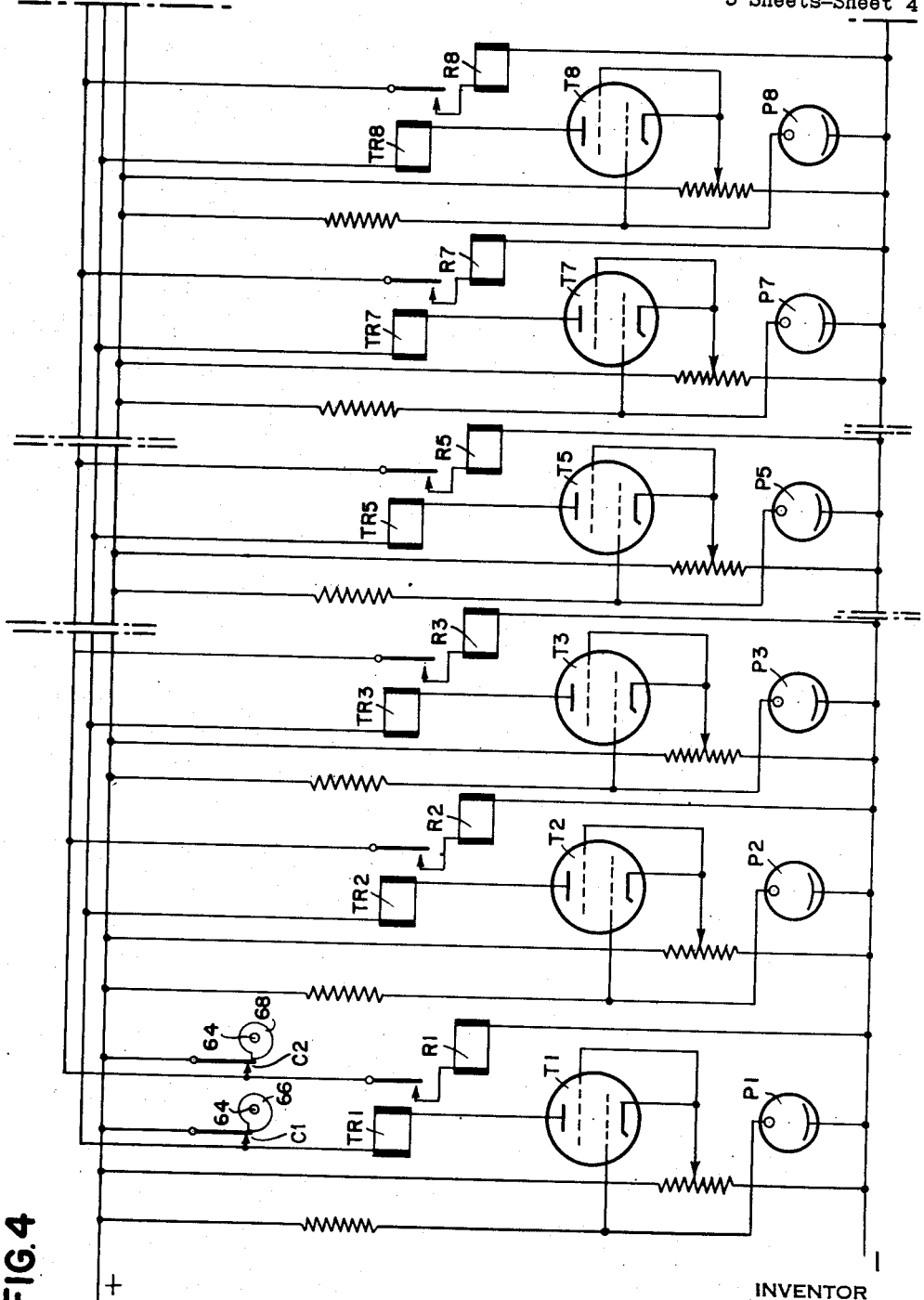
Figure 5:
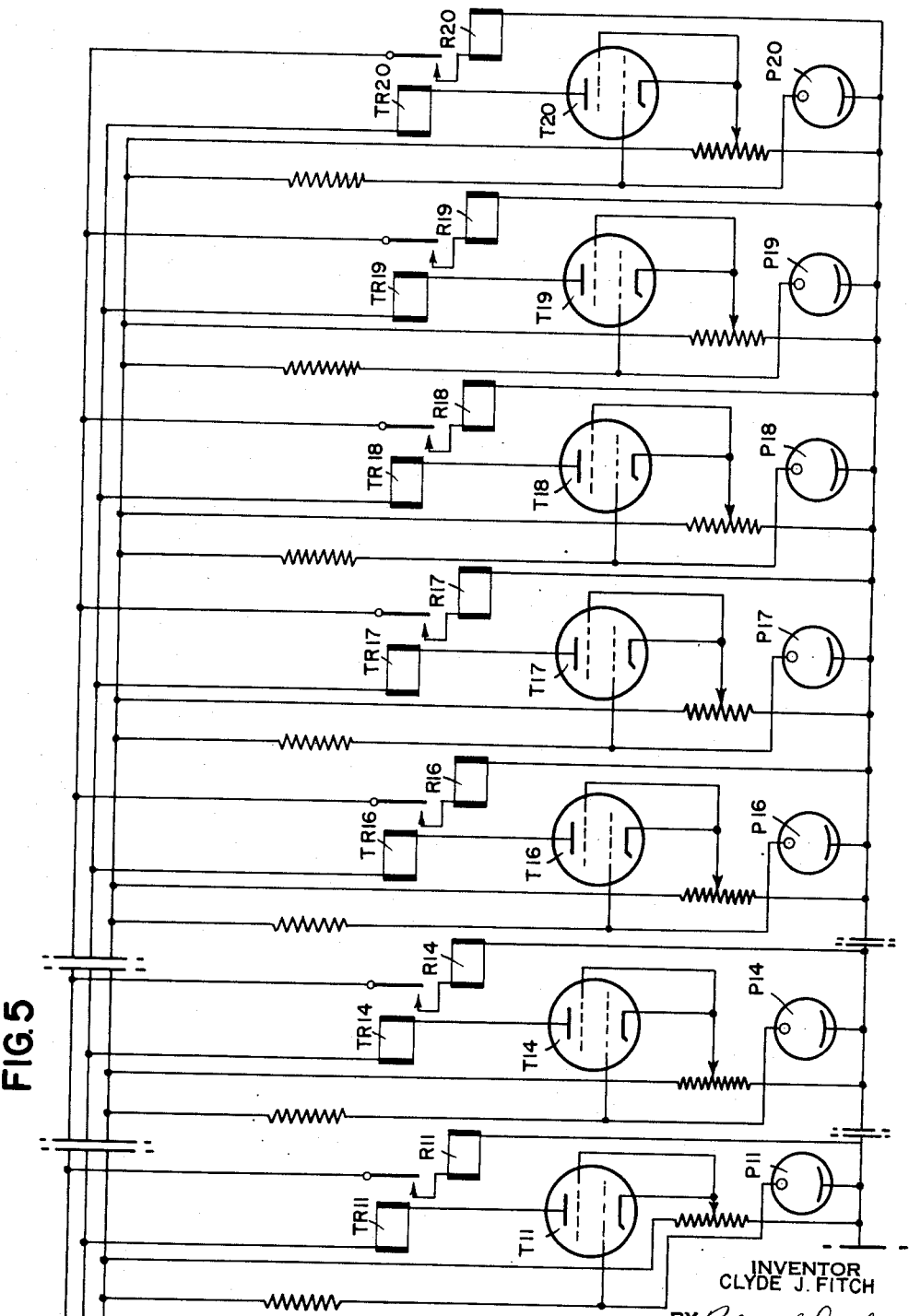

Figs. 3 and 3A together constitute a diagram of the character analyzing circuits; and Figs. 4 and 5 illustrate the details of the reading head circuits.

Figure 1:
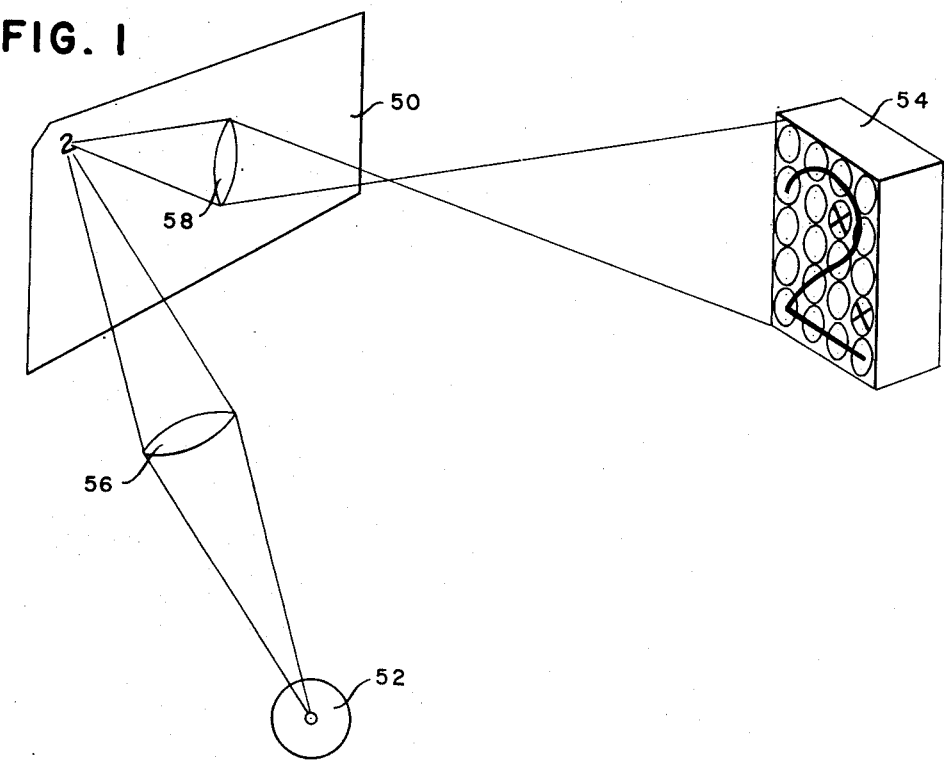
Fig. 1 is a diagrammatic illustration representing means for projection of a numeral against the face of a plurality of photoelectric devices arranged in a predetermined pattern.

The reading head comprises an optical unit which is adapted to project an enlarged image of the character to be read onto a fixed pattern of photoelectric cells. In Fig. 1 of the drawings a document 50 has the numeral "2" on the face thereof. The document is presented in a reading position by any suitable means whereby a beam of light from a lamp 52 is concentrated on the document number and the image thereof is projected against the face of a photoelectric cell mosiac 54. Any suitable lens system including a concentrating lens 56 and a correcting lens system 58 may be employed in the projecting system, such elements being shown only diagrammatically in Fig. 1 of the drawings because they are not of the essence of the invention claimed herein.

Figure 2A:
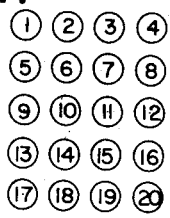
Fig. 2A is a diagrammatic illustration of the photoelectric cell arrangement of the reading head wherein the cells are numbered for convenient reference.
Figure 2B:
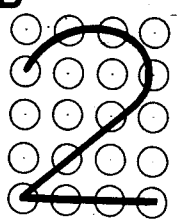
Figs. 2B, 2C, 2D, 2E and 2F are diagrammatic illustrations of different light patterns projected against the face of the photoelectric cell assembly of Fig. 2A.
Figure 2C:
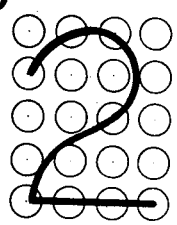
Figure 2D:
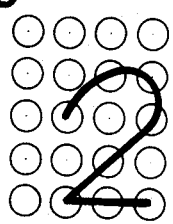
Figure 2E:
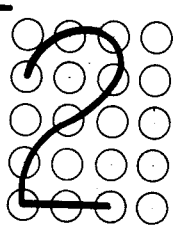
Figure 2F:
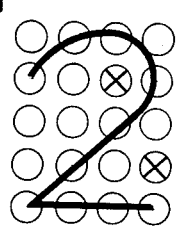

The photoelectric cell pattern or mosaic 54 shown in Figs. 1 through 2F of the drawings comprises twenty photoelectric cells arranged in a rectangular pattern wherein the individual cells are in fixed relation to each other. The number of photoelectric cells shown in the drawings is sufficient to describe the principle of operation, but it is apparent that the number of such cells may be varied, the only requirement being that the number of cells used be great enough so that the resolving power of the mechanism will be sufficient to distinguish between the different character designations. In other words, a manually written figure "2," for example, no matter how many different ways it may be written within reason, must always affect a different combination of photoelectric cells of the mosaic 54 than would be affected by any other manually written numbers. Herein let it be assumed that the photoelectric cells of the mosaic 54 are normally conductive in the presence of light and that the projected image of the character being read will render the cells non-conductive.

Figs. 4 and 5 show how the output of each photoelectric cell is used to trigger a thyratron and operate a circuit control relay. Each photoelectric cell is connected in the grid circuit of an associated thyratron. Thus, each of photoelectric cells P1 through P20 (Figs. 4 and 5) has associated therewith one of the thyratrons T1 through T20, respectively. Each of the thyratron controlled relay TR in its plate circuit. Thus the thyratrons T1 through T20 each has associated therewith a relay TR1 through TR20, respectively. When a change in condition of a photoelectric cell occurs, its associated thyratron will be fired and the associated TR relay will thereby be energized. Each TR relay will close a circuit through an associated analyzing circuit control R relay. Consequently, there has been provided a series of the analyzing circuit control relays R1 through R20 which are energized by the closing of the points of the respectively related thyratron operated relays TR1 through TR20. The relays R1 through R20 control the analyzing circuit shown in Figs. 3 and 3A.

Using twenty photoelectric cells, the character images are in effect converted into a twenty unit code by the reading head. In a twenty unit code there are 1,480,567 permutations. Only a small number of these permutations will be used ordinarily. In the analyzing circuit shown in Figs. 3 and 3A provision is made for the recognition of a hundred or more different code combinations for each character. In a device for reading the numerals "1" through "9" and "0," there would be provided ten such analyzing circuits, one for each numeral, and the circuits would, therefore, analyze a plurality of different styles of each of the ten digits.

To translate such a great number of code combinations by means of the conventional christmas tree chain of relay contacts would be impractical because of the number and complexity of relays and circuits required. The simplified analyzing or translating circuit herein has, therefore, been developed for the reduction of the required circuits to a practical value. This has been accomplished by the use of wire contact relays having pluggable jumper wires for establishing generally parallel circuits through the relay contacts and by the use of small gaseous discharge devices, i. e. neon lamps, to prevent back circuits in the cross-grid network.

According to this illustrative embodiment of the invention, the character analyzing circuits are controlled by the contacts of the twenty wire contact relays R1—R20, each of which has a plurality of contacts in the analyzing circuits. The relay controlled circuit of Fig. 3A may be considered as the input circuit, whereas the relay controlled circuit of Fig. 3 may be considered the output circuit. The input circuit terminates in a 12 x 12 cross-bar network 60 shown at the upper left of Fig. 3A. This network consists of a plurality of mutually insulated conductors arranged in intersecting relation. The cross-grid network is selectively controlled by the input circuit for ordering an output current into the output circuit.

Intersecting bars of the cross-grid network are electrically connected by means of gaseous discharge devices, herein shown as neon lamps 62. The manner in which these neon lamps are used for completing and controlling the circuits through the network 60 may be explained by reference to Figs. 3 and 3A, wherein relays R3, R4, R7, R10, R12, R13, R16, R18 and R20 are shown energized as when a character is being read. A circuit can be traced from the right-hand side of the composite analyzing circuit (Fig. 3A) from the positive line to a relay contact A and through the chain of contacts to a terminal B. From there the circuit continues from the entrance to the cross-bar network to a neon lamp L and out to a terminal D, through the output relay chain to a contact E and a resistor R. The voltage impressed across the resistor R triggers a gas tube T and energizes an output relay R21.

It will be observed that in parallel with the neon lamp L is a maze of circuits and neon lamps, but in the case of each circuit other than the predetermined desired one (as traced above), at least three neon lamps are in series. If the applied voltage is sufficient to break down one lamp but insufficient to break down three lamps in series, lamp L only will conduct the impulses, completing the circuit to the resistor R. As shown, cross-grid network 60 is conditioned by a multiplicity of neon lamps to provide a plurality of circuits. For example: when the circuit as traced above is completed from relay contact A through the chain of contacts to terminal B and then through the cross-bar network via neon lamp L and out to terminal D, a number of other circuits to terminals H, J, or K, for instance, could also be completed via neon lamps $L_2$, $L_3$ and $L_4$, respectively, if these terminals (H, J or K) were connected to completed circuits through the output relay chain to contact E. However, only one of these possible circuits will ordinarily be connected at a time. Now, undesired circuits will not be completed by this cross-grid network because, should it be attempted to reach terminal M, for instance, after reaching terminal B as above (traveling from contact A through the chain of contacts to terminal B); it would be necessary to go through at least three neon lamps in series, e. g. lamps L, $L_5$ and $L_6$, to reach the circuit of terminal M. Therefore, since the voltage employed is sufficient to break down one neon lamp but not enough to break down three lamps in series, no undesired circuits can be completed.

As intimated in the introductory portion of this description, one such analyzing circuit is required for each character. The analyzing circuit control relays R1 through R20 are controlled by the thyratron controlled relays TR1 through TR20. The coils of relays R1 through R20 of the analyzing circuit for one character may be wired in parallel with similar relays of analyzing circuits adapted to the recognition of other characters. The photoelectric cell impulses may be amplified if desired. This means that where a full set of thirty-six characters are to be read, there will be a set of relays R1 through R20 corresponding to each of the thirty-six characters; and corresponding relays for each set will be connected in parallel, to be actuated simultaneously by the actuation of whichever relays TR1 through TR20 is actuated. In other words, when any given combination of photoelectric cells is effected by a character being read, all of the corresponding relays R1-R20 in every character analyzing circuit will be simultaneously actuated. However, only one of the character analyzing circuits will complete an energizing circuit for its output relay R21, to give an indication that its character has been read.

The nature of the mechanism may be more clearly developed by a description of the operation thereof. The image of the character to be read is projected from the document 50 onto the mosaic of photoelectric cells 54, each of which controls the operation of an associated relay of the thyratron controlled relay group TR1 through TR20. Contacts of relays TR1 through TR20 control the analyzing circuit control relays R1 through R20, respectively, setting up a chain circuit through one of the neon lamps 62 and resistor R. This triggers the gas tube T and energizes the output relay R21. A pair of contacts G and F are controlled by the output relay R21. Contact G may be used to control an external circuit such as that of an electrically controlled typewriter, printer or card punch. Typical of the reproducing devices controllable by this mechanism are duplicating punches of the type shown in Lee and Phillips Patents No. 1,772,186, granted August 5, 1930, printing tabulators of the type shown in Pierce Patent No. 1,780,685, granted November 4, 1930, and typewriters of the type shown in Tholstrup Patent No. 2,388,351, granted November 6, 1945, for example. Contact G may also control a suitable mechanism, not shown, that will advance the document 50, Fig. 1, to the next position for reading a new character.

Contact F is adapted to close a circuit to a clutch magnet (not shown) which controls rotation of a timing shaft 64 (Figs. 3 and 4) upon which cams 66, 68 and 70 are mounted. These cams in turn control cam contacts C (Fig. 3) and C1 and C2 (Fig. 4) respectively. Cam contact C is adapted to break the circuit to the gas tube T and restore the same while the cam contacts C1 and C2 break the circuits through the TR and R relays, respectively. If the mechanism fails to recognize a character and consequently fails to produce an output pulse, the relay R21 will not pick up, document 50, Fig. 1, will not advance and the machine is conditioned to stop under such circumstances. When a character being read fails to produce an output pulse, the operator will examine the document to see which character is being read. Suppose it is a poorly written figure "2." The operator will then observe which of the circuit control relays R1-R20 are energized, and he will then connect the necessary relay contacts by means of pluggable jumper wires 72 to complete a circuit through the analyzing relay contact network and at the same time he will insert a neon lamp 62 in the proper location within the cross-bar network 66, thus providing an output circuit to the terminal E, resistor R and gas tube T. This in effect is the procedure that is adopted in respect to each differently written character the mechanism fails to recognize. Thus, a large variety of different analyzing circuits of the mechanism may be set up by the procedure just described.

Figs. 2B through 2E show the particular photoelectric cells of the mosaic 54 that are affected by the figure "2" written four different ways. Fig. 2F corresponds to Fig. 2B insofar as the form of the numeral is concerned, but illustrates a special condition wherein photoelectric cells 7 and 16 are also affected. By comparing Figs. 2B through 2F to Fig. 2A, it will be seen that in Fig. 2B photoelectric cells 2, 3, 5, 8, 11, 14, 17, 18, 19 and 20 are affected; in Fig. 2C photoelectric cells 2, 3, 5, 11, 17, 18, 19 and 20 are affected; in Fig. 2D photoelectric cells 7, 8, 10, 12, 15, 18, 19 and 20 are affected; in Fig. 2E photoelectric cells 2, 3, 5, 7, 10, 13, 17, 18 and 19 are affected; and in Fig. 2F photoelectric cells 2, 3, 5, 7, 8, 11, 14, 16, 17, 18, 19 and 20 are affected.

When the outline of a "2" affects the photoelectric cells indicated in Fig. 2B, the corresponding relays will be energized. If no output circuit is produced upon the reading of the numeral according to the form shown in Fig. 2B, the operator will arrange new jumper circuits by plugging the jumper wires 72 between respective relay points to produce an output circuit at terminal E. Fig. 2F corresponds to the condition of Fig. 2B, excepting that photoelectric cells 7 and 16 are also affected. This may happen because of dirt spots on the original document or from some other cause. This, of course, will result in energization of relays 7 and 16 also. Instead of plugging up new jumper circuits to meet a special condition of this kind, it is necessary merely to remove the jumper wires 72a and 72b (Fig. 3) and add jumper 72c, these being shown in dotted lines in the drawings. This serves to isolate relay R7 contact point in this particular jumper circuit so that a through circuit is established and neon lamp 62a will conduct the impulse, whether or not photoelectric cell 7 and its corresponding relay R7 are energized.

The same technique is followed in respect to the circuit condition caused when photoelectric cell 16 is affected. In this case jumper wires 72d and 72e are replaced by a jumper wire 72f, so that the circuit is maintained whether or not photoelectric cell 16 and its associated relay R16 are energized.

The nature of the mechanism and the manner in which it may be conditioned for recognizing a great number of differently formed characters has been described and illustrated herein in connection with a system, the capacity of which has been limited in the interest of simplification. It will appear, however, that with a few additional relays the capacity of the system can be greatly increased. For accommodating letters and numbers, 36 analyzing circuits are required, but adopting such system for use in connection with reasonably uniform copy, as for example typewritten copy, fewer contact points and neon lamps or diodes will be required for analyzing each character. When working with manually written numerals, for example, it may be necessary to recognize a few hundred of each of the ten numerals, whereas when working with uniform typewriter copy comprising numerals and letters, variations in registration and printing will be less with the result that the number of recognition circuits for each character may be in the order of ten or twelve.

It is to be understood that the invention is not limited to the specific embodiment herein illustrated and described, but may be used in other ways without departure from its spirit as defined by the following claims.

I claim:

1. A character reading mechanism comprising a plurality of photoelectric devices in a predetermined arrangement, individual circuit connections to each of said photoelectric devices including a relay operative upon change of condition of such photoelectric device, each relay being adapted upon energization to operate a plurality of contacts adapted to establish a plurality of parallel circuits between said relays, a cross-grid network consisting of a plurality of mutually insulated conductors arranged in intersecting relation selectively controlled by said contacts for completing an output circuit according to a preselected light responsive pattern projected upon said photoelectric devices, gaseous discharge devices interconnecting conductors of said cross-grid network at points of intersection, and pluggable jumper connections between contacts of said relays for ordering said cross-grid network to complete an output circuit according to variations of the said light responsive pattern.

2. A character reading mechanism for reading characters having substantial variations among successive representations of a given character comprising a plurality of photoelectric devices in a predetermined arrangement, means for projecting a light pattern in accordance with each character to be read upon said photoelectric devices, individual circuit connections to each of said photoelectric devices including a current responsive device for each character to be read operative upon a change of condition of such photoelectric device, each current responsive device being adapted upon energization to operate a plurality of contacts, other circuit connections selectively controlled by said contacts for completing an output circuit for each character being read, said other circuit connections including a plurality of circuits each for completing said output circuit in order to provide for the variations in each character.

3. A character reading mechanism for reading characters having substantial variations among successive representations of a given character comprising a plurality of photoelectric devices in a predetermined arrangement, means for projecting a light pattern in accordance with each character to be read upon said photoelectric devices, individual circuit connections to each of said photoelectric devices including a current responsive device for each character to be read operative upon a change of condition of such photoelectric device, each current responsive device being adapted upon energization to operate a plurality of contacts, other circuit connections selectively controlled by said contacts for completing a different output circuit for each character being read, said other circuit connections including a plurality of circuits each for completing said output circuit for a given character, said plurality of circuits including a cross-grid network for selectively completing various of said plurality of circuits in order to allow various representations of a given character still to cause the output circuit for that character to be completed.

4. A character reading mechanism for reading characters having substantial variations among successive representations of a given character comprising a plurality of photoelectric devices in a predetermined arrangement, means for projecting a light pattern in accordance with each character to be read upon said photoelectric devices, individual circuit connections to each of said photoelectric devices including a current responsive device for each character to be read operative upon a change of condition of such photoelectric device, each current responsive device being adapted upon energization to operate a plurality of contacts, other circuit connections selectively controlled by said contacts for completing a separate output circuit for each character being read, said other circuit connections including a plurality of circuits each for completing said output circuit for a given character, said plurality of circuits including a cross-grid network for selectively completing various of said plurality of circuits in order to allow various representations of a given character still to cause the output circuit for that character to be completed, said cross-grid network consisting of a plurality of mutually insulated conductors arranged in intersecting relation, and means interconnecting conductors of said cross-grid network at points of intersection.

5. A character reading mechanism for reading characters having substantial variations among successive representations of a given character comprising a plurality of photoelectric devices in a predetermined arrangement, means for projecting a light pattern in accordance with each character to be read upon said photoelectric devices, individual circuit connections to each of said photoelectric devices including a relay for each character to be read operative upon a change of condition of such photoelectric device, each relay being adapted upon energization to operate a plurality of contacts, other circuit connections selectively controlled by said contacts for completing an individual output circuit for each character being read, said other circuit connections including pluggable jumper connections between said contacts for setting up a circuit to correspond to each variation of a given character, said other circuit connections further including a cross-grid network for selectively completing the variation corresponding circuits in order to provide various circuits for completing each individual output circuit for its corresponding character.

6. A character reading mechanism for reading characters having substantial variations among successive representations of a given character comprising a plurality of photoelectric devices in a predetermined arrangement, means for projecting a light pattern in accordance with each character to be read upon said photoelectric devices, individual circuit connections to each of said photoelectric devices including a relay for each character to be read operative upon a change of condition of such photoelectric device, each relay being adapted upon energization to operate a plurality of contacts, other circuit connections selectively controlled by said contacts for completing an individual output circuit for each character being read, said other circuit connections including pluggable jumper connections between said contacts for setting up a circuit to correspond to each variation of a given character.

7. A character reading mechanism for reading characters having substantial variations among successive representations of a given character comprising a plurality of photoelectric devices in a predetermined arrangement, means for projecting a light pattern in accordance with each character to be read upon said photoelectric devices, individual circuit connections to each of said photoelectric devices including a relay for each character to be read operative upon a change of condition of such photoelectric device, each relay being adapted upon energization to operate a plurality of contacts, other circuit connections selectively controlled by said contacts for completing a separate output circuit for each character being read, said other circuit connections including a plurality of circuits each for completing said output circuit for a given character, said plurality of circuits including a cross-grid network for selectively completing various of said plurality of circuits in order to allow various representations of a given character still to cause the output circuit for that character to be completed, said cross-grid network consisting of a plurality of mutually insulated conductors arranged in intersecting relation, and means interconnecting conductors of said cross-grid network at points of intersection, said plurality of circuits further including pluggable jumper connections between contacts of said relays to set up a corresponding one of said plurality of circuits for each variation of the character being read.

References Cited in the file of this patent

UNITED STATES PATENTS

| Number | Name | Date |
|---|---|---|
| 1,547,964 | Semat | July 28, 1925 |
| 1,853,443 | Mavl | Apr. 12, 1932 |
| 2,096,954 | Bellamy | Oct. 26, 1937 |
| 2,189,001 | Gould | Feb. 6, 1940 |
| 2,266,779 | Loughridge | Dec. 23, 1941 |
| 2,337,553 | Hofgaard | Dec. 28, 1943 |
| 2,577,141 | Mauchly | Dec. 4, 1951 |

FOREIGN PATENTS

| Number | Country | Date |
|---|---|---|
| 563,918 | France | Oct. 6, 1943 |